(12) United States Patent
Huo et al.

(10) Patent No.: US 11,209,380 B2
(45) Date of Patent: Dec. 28, 2021

(54) SENSOR WITH NONPOROUS REFERENCE JUNCTION

(71) Applicant: Endress+Hauser Conducta Inc., Anaheim, CA (US)

(72) Inventors: Jinshan Huo, Corona, CA (US); Thelma Saclot, Long Beach, CA (US)

(73) Assignee: Endress+Hauser Conducta Inc., Anaheim, CA (US)

( * ) Notice: Subject to any disclaimer, the term of this patent is extended or adjusted under 35 U.S.C. 154(b) by 149 days.

(21) Appl. No.: 16/154,302

(22) Filed: Oct. 8, 2018

(65) Prior Publication Data

US 2020/0110052 A1 Apr. 9, 2020

(51) Int. Cl.
*G01N 27/31* (2006.01)
*G01N 27/30* (2006.01)
*G01N 27/333* (2006.01)

(52) U.S. Cl.
CPC ............ *G01N 27/31* (2013.01); *G01N 27/301* (2013.01); *G01N 27/302* (2013.01); *G01N 27/333* (2013.01)

(58) Field of Classification Search
CPC .............................. G01N 27/31; G01N 27/333
See application file for complete search history.

(56) References Cited

U.S. PATENT DOCUMENTS

| | | |
|---|---|---|
| 3,298,944 A | 1/1967 | Luck |
| 3,431,182 A * | 3/1969 | Frant ................. G01N 27/333 205/778.5 |
| 3,790,463 A | 2/1974 | Gealt |
| 4,184,935 A | 1/1980 | Schindler et al. |
| 4,355,116 A | 10/1982 | Lee et al. |

(Continued)

FOREIGN PATENT DOCUMENTS

DE 102012111814 A1 6/2014

OTHER PUBLICATIONS

H.R. Bronstein, Lanthanum Trifluoride as a Membrane in a Reference Electrode for Use in Certain Molten Fluorides, Electrochemical Science and Technology, Feb. 1972, p. 125-28. (Year: 1972).*

(Continued)

*Primary Examiner* — Luan V Van
*Assistant Examiner* — Caitlyn Mingyun Sun
(74) *Attorney, Agent, or Firm* — Christopher R. Powers; Endress+Hauser (USA) Holding Inc.

(57) ABSTRACT

According to at least one aspect of the present disclosure, a reference half-cell for an electrochemical sensor for measuring a medium is disclosed. The reference half-cell includes a housing defining a chamber containing an electrolyte, the housing including a wall having an aperture therethrough, and an electrode disposed in the electrolyte in the chamber. The reference half-cell further includes a reference junction disposed in the aperture such that an interface between the reference junction and the housing wall is impermeable. The reference junction is electrically or ionically conductive and impermeable to the measured medium and the electrolyte, and the reference junction enables a constant potential at the electrode. An electrochemical sensor and oxidation-reduction potential sensor employing the reference junction are also disclosed.

18 Claims, 3 Drawing Sheets

(56) References Cited

U.S. PATENT DOCUMENTS

| | | | |
|---|---|---|---|
| 5,152,882 A * | 10/1992 | Benton | G01N 27/401 |
| | | | 204/416 |
| 5,221,456 A | 6/1993 | Benton et al. | |
| 8,262,878 B2 | 9/2012 | Wolf et al. | |
| 9,005,416 B2 | 4/2015 | Mosely et al. | |
| 9,696,273 B2 * | 7/2017 | Wilhelm | G01N 27/414 |
| 9,810,655 B2 | 11/2017 | Park et al. | |
| 2006/0042354 A1 * | 3/2006 | Moritz | G01N 27/4141 |
| | | | 73/31.06 |
| 2015/0014164 A1 * | 1/2015 | Lee | G01N 27/302 |
| | | | 204/412 |
| 2015/0027887 A1 * | 1/2015 | Lee | G01N 27/3335 |
| | | | 204/406 |
| 2015/0212041 A1 * | 7/2015 | Stahl | G01N 27/4165 |
| | | | 205/787.5 |
| 2017/0199145 A1 * | 7/2017 | Schonfuss | G01N 27/301 |

OTHER PUBLICATIONS

G. Peters, A Reference Electrode with Free-Diffusion Liquid Junction for Electrochemical Measurements under Changing Pressure Conditions, Analytical Chemistry, 1997, p. 2362-66. (Year: 1997).*

Cushman, Chris, Anatomy of a pH Electrode Glass pH Probes, Part 4 of 4, May 8, 2015, https://www.ysi.com/ysi-blog/water-blogged-blog/2015/05/anatomy-of-a-ph-electrode-glass-ph-probes-part-of-4, 4 pp. (last accessed Oct. 18, 2018).

* cited by examiner

SENSOR WITH NONPOROUS REFERENCE JUNCTION

TECHNICAL FIELD

The present disclosure generally relates to electrochemical sensors, in particular electrochemical sensors with nonporous junctions.

BACKGROUND

Electrochemical sensors are often used for determining concentrations of certain substances (e.g., analytes) in a measured medium, both in laboratory measurements and in industrial process measurements, in many fields of chemistry, environmental analysis, biochemistry, biotechnology, pharmacy, food technology and water management. Conventional electrochemical sensors often include a measuring half-cell, which forms a potential dependent on the concentration of the analyte in the measured medium, a reference half-cell, which outputs a potential independent of the analyte concentration, and a measuring circuit, which generates a measurement signal representing the potential difference between the measuring half-cell and the reference half-cell.

The reference half-cell of an electrochemical sensor is frequently embodied as an electrode of second type, for example, as a silver/silver chloride electrode (Ag/AgCl electrode). Such a reference half-cell generally has a reference electrolyte contained in a housing of an electrically insulating material, into which a chloridized silver wire extends. The reference electrolyte may be, for example, a 3 molar KCl solution. The reference half-cell generally further includes a reference junction arranged in a wall of the housing wall, the reference junction being a passageway or a porous diaphragm through which the reference electrolyte is in ionically conducting contact via a liquid-liquid interface with a surrounding medium to be measured (i.e., the measured medium).

Whether a passageway (e.g., bundle of wires forming small capillary channels) or a porous diaphragm (e.g., ceramic or polytetrafluoroethylene having a given a number and size distribution of pores), a disadvantage of such reference junctions is that the reference potential generated may not be constant of the service life of the sensor due to contamination or dilution of the reference electrolyte. For example, diffusion may occur through the reference junction in both directions, due to concentration differences between the reference electrolyte and the measured medium. Chemical components in the measured medium may diffuse into the reference electrolyte, contaminating the reference electrolyte and causing deviation in the reference potential. In the opposite direction, a loss of reference electrolyte or changes in concentration of the reference electrolyte may occur. Such changes may be driven by diffusion and/or pressure and temperature gradients between the reference electrolyte and the measured medium. Further, such porous reference junctions may become clogged, particularly where either the measured medium or the electrolyte are a viscous medium, thereby degrading the performance of the electrochemical sensor by negatively affecting the conductivity between the measuring and reference half-cells.

Accordingly, there remains a need for further contributions in this area of technology.

BRIEF SUMMARY

According to at least one aspect of the present disclosure, a reference half-cell for an electrochemical sensor for measuring at least one measured variable of a measured medium includes a housing defining a chamber containing an electrolyte, the housing including a wall having an aperture therethrough, an electrode disposed in the electrolyte in the chamber, and a reference junction disposed in the aperture such that an interface between the reference junction and the housing wall is impermeable. In such an embodiment, the reference junction is electrically or ionically conductive and impermeable to the measured medium and the electrolyte, and the reference junction enables electrical current flow between the electrode and a measuring half-cell and maintains a constant potential at the electrode.

In at least one embodiment according to the present disclosure, the reference junction consists essentially of lanthanum trifluoride. In an embodiment, the reference junction consists essentially of a carbon-containing compound. In a further embodiment, the reference junction consists essentially of graphite. In certain embodiments, the reference junction consists essentially of glass-like carbon. In certain embodiments, the reference junction consists essentially of graphene. In yet another embodiment, the reference junction consists essentially of ion-conductive glass having an impedance less than 2 gigaohm.

In at least one embodiment, the electrode is a silver wire coated with a silver halide. In certain embodiments, the silver halide is silver chloride, and wherein the electrolyte includes potassium chloride. The electrolyte is a gel, liquid or solid.

According to another aspect of the present disclosure, an electrochemical sensor for measuring at least one measurand of a medium includes a measuring half-cell including a measuring housing including a measuring electrode, a measuring electrolyte and an ion-selective sensing element, the ion-selective sensing element being sensitive to a species of the medium. The electrochemical sensor further includes a reference half-cell including a reference housing defining a chamber containing a reference electrolyte, the reference housing including a wall having an aperture therethrough, a reference electrode disposed in the reference electrolyte in the chamber, and a reference junction disposed in the aperture such that an interface between the reference junction and the housing wall is impermeable. In such an embodiment, the reference junction is electrically or ionically conductive and impermeable to the medium and the reference electrolyte, and the reference junction enables electrical current flow between the reference and measuring electrodes and maintains a constant reference potential at the reference electrode.

According to a further aspect of the present disclosure, an oxidation-reduction potential sensor for measuring at least one measurand of a medium includes a reference half-cell including a reference housing defining a chamber containing a reference electrolyte, the reference housing including wall having an aperture therethrough, a reference electrode disposed in the reference electrolyte in the chamber, a reference junction disposed in the aperture such that an interface between the reference junction and the housing wall is impermeable, and a measuring electrode. In such an embodiment, the reference junction is electrically or ionically conductive and impermeable to the medium and the reference electrolyte, and the reference junction enables electrical current flow between the reference and measuring electrodes and maintains a constant reference potential at the reference electrode.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIG. 1 shows a cross-sectional view of an embodiment of a reference half-cell according to the present disclosure.

DETAILED DESCRIPTION

The present application discloses various embodiments of a reference junction and sensors and methods for using and constructing the same. According to one aspect of the present disclosure, a reference junction is disclosed that is electrically or ionically conductive, nonporous and impermeable to both a reference electrolyte and a medium to be measured. According to a further aspect of the present disclosure, reference half-cells and sensors are disclosed, including novel and inventive potentiometric, amperometric and oxidation-reduction potential sensors, which employ the disclosed reference junction. The disclosed reference junction enables sensors that are less susceptible to drift due to clogging of the junction or dilution of a reference electrolyte and that prevent contamination of a medium to be measured, yielding an inventive sensor that is more reliable and longer lived than conventional sensors. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
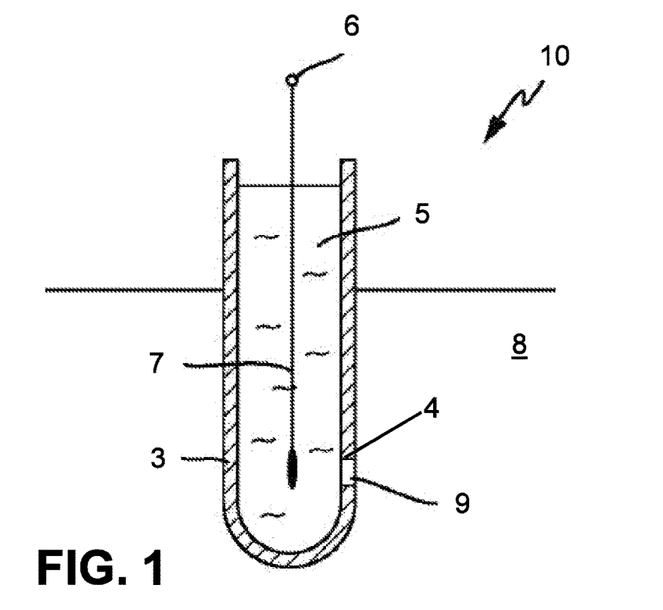

FIG. 1 illustrates a reference half-cell 10 according to at least one embodiment of the present disclosure, the reference half-cell 10 partially immersed in a measured medium 8. The measured medium 8 is a medium of which an analyte is to be determined or measured. As non-limiting examples, the measured medium 8 may be an aqueous solution, such as wastewater or drinking water, and the analyte may be hydrogen ions, fluoride ions, sodium ions, silver ions, lead ions, cadmium ions and/or potassium ions.

The reference half-cell 10 may include a reference housing 3 that defines a volume, which contains a reference electrolyte 5. The reference housing 3 and volume defined therein may be any suitable shape for a given implementation of the reference half-cell 10, including, as a non-limiting example, an essentially cylindrical shape, as illustrated in FIG. 1. The reference housing 3 may be an electrically insulating material, for example, glass or a synthetic material, such as a plastic. The reference electrolyte 5 is formulated to enable a flow of electrical current therethrough. The reference electrolyte 5 may be, for example, an aqueous 3 molar potassium chloride (KCl) solution or some other suitable alkali metal halide solution. In certain embodiments, the reference electrolyte 5 may be a viscous material, such as a gel, or a solid material.

The reference half-cell 10 includes a reference junction 9, which may be disposed in an aperture 4 through a wall of the reference housing 3, as shown in FIG. 1. The reference junction 9 enables a flow of electrical current across the reference junction 9 between a reference electrode 7 of the reference half-cell 10 and a measuring electrode (not shown in FIG. 1) via the measure medium 8. In certain applications, the reference junction 9 may be referred to as a diaphragm. The reference junction 9 may be made, composed or consist essentially of an electrically or ionically conductive, nonporous material that is impermeable to both the reference electrolyte 5 and the measured medium 8. In certain embodiments, the reference junction 9 may be a solid material.

The reference junction 9 may be disposed in the aperture 4 such that an interface between the reference housing 3 and the reference junction 9 is impermeable to both the reference electrolyte 5 and the measured medium 8, as described further herein. As used herein, impermeable means that no mass transfer occurs, whether through the interface or the reference junction 9, either of molecules or ions. As non-limiting examples, the interface may be made impermeable by welding, brazing, soldering, sealing with a gasket or O-ring, adhesive or sealant, or by any other suitable process that seals the reference junction 9 to a housing in which the reference electrolyte 5 is contained, such as the reference housing 3.

The reference half-cell 10 may further include the reference electrode 7 extending into the reference electrolyte 5. The reference electrode 7 forms, with the reference electrolyte 5 in contact with the measured medium 8 via the reference junction 9, a reference electrode. In at least one embodiment, the reference electrode 7 may be a metal electrode, for example, a chlorided silver wire. In certain embodiments, the reference half-cell 10 may be an electrode of the second type, specifically a silver/silver-chloride (Ag/AgCl) electrode where the reference electrolyte 5 includes chloride anions. In alternative embodiments, the reference half-cell 10 may include other known combinations of reference electrode 7 and reference electrolytes 5, thereby forming other known types of electrodes.

The reference junction 9 enables electrical current to flow from the reference electrode 7 to the measuring electrode through the reference electrolyte 5 and the measured medium 8 in which the reference half-cell 10 is at least partially immersed. The reference junction 9 further enables electrical current to flow from the measuring electrode, through the reference electrolyte 5 and the measured medium 8, to the reference electrode 7. The reference half-cell 10 is at least partially immersed in the measured medium 8 such that the reference junction 9 is in contact with the measured medium 8. The reference junction 9 may be in electrical or ionic conductive contact with the measured medium 8.

The electrical current flow enables electrochemical measurements, for example, potentiometric or amperometric measurements, of the measured medium 8. The reference half-cell 10 may include a connection 6 associated with the reference electrode 7. Via the connection 6, the reference half-cell 10 generates a stable reference potential independent of the measured variable or other ion concentrations of the measured medium 8. The stable reference potential is enabled by the nonporous reference junction 9, which prevents an outflow of the reference electrolyte 5 from the reference housing 3 into the measured medium 8 and prevents an inflow of the measured medium 8 into the reference housing 3.

The nonporous reference junction 9 prevents mass transfer of the reference electrolyte 5 and its constituents from the volume of the reference housing 3 to the measured medium 8 and vice versa. The nonporous, impermeable reference junction 9 prevents the outflow of the reference electrolyte 5 from the reference housing 3 into the measured medium 8 and the inflow of the measured medium 8 into the reference electrolyte 5 within the reference housing 3, thereby preventing contamination and/or dilution of both. Because neither the reference electrolyte 5 nor the measured medium 8 can diffuse into or traverse the reference junction 9 or the interface between the reference junction 9 and the reference housing 3, the potential at the reference electrode 7 does not change over time. Therefore, the reference potential, and hence the performance of the reference half-cell 10, does not degrade with time whether due to clogging of pores of the reference junction 9 or contamination or dilution of the reference electrolyte 5, which are common problems in certain applications with conventional, porous reference junctions, problems leading to drift of the reference potential generated by such a conventional reference half-cell. Further, the reference junction 9 enables a reference potential that is relatively low-noise or essentially no-noise. Relative to conventional reference junctions, the reference junction 9 enables a reference half-cell that is more reliable with a longer life cycle.

The reference junction 9 may be made, composed or consists essentially of a nonporous material having electrical conductivity, including such non-limiting examples as ion conductive materials, conductive polymers, solid electrolyte materials, conductive oxide and ceramic materials, doped glass material and carbon-containing compounds. The reference junction 9 may further include a crystalline lattice structure with crystal defects enabling electrical conductivity without mass transfer.

In at least one embodiment, the reference junction 9 may be lanthanum trifluoride ($LaF_3$). Such an embodiment may be employed where the fluoride content of a measured medium is relatively low and/or does not vary significantly such that the contribution of the fluoride content or its variation to the value of the measured variable (e.g., pH or ORP) is significantly lower (e.g., less than 5%) than the contribution of the analyte to be measured. In alternative embodiments, the reference junction 9 may be a carbon-containing compound or allotrope of carbon such as graphite, graphene or glass-like carbon (e.g., sometimes called glassy carbon or vitreous carbon). In further embodiments, the reference junction 9 may be ion-conductive glass, doped or formulated to enable ion conductivity with low impedance, for example, less than 2 gigaohm ($G\Omega$) or, in certain embodiments, less than 1 $G\Omega$. In such an embodiment, reference junction 9 may be formulated to have the same ion conductivity as conventional pH glass but to be insensitive to hydrogen ions, unlike conventional pH glass. For example, in applications where the sodium content of a measured medium is relatively stable, the reference junction 9 may be a sodium-selective glass, formulated to be insensitive to hydrogen ions and employed in a reference half-cell for measuring the pH of the measured medium. In principle, the total of an impedance of the reference half-cell 10 and an impedance of a corresponding measuring half-cell should be low, usually less 3 $G\Omega$; however, the total impedance has no clear boundary requirement. Accordingly, the reference junction 9 may have an impedance less than 1-2 $G\Omega$ as a non-limiting example.

The reference junction 9 may be advantageous in applications where the measured medium 8 is high-purity water. For example, reference junction 9 may be employed in a reference half-cell used to analyze highly pure water, such as in power plants, food and beverage production processes, and pharmaceutical production processes. In such applications, a relatively steep concentration gradient exists across the reference junction 9 from the reference electrolyte 5, containing certain ions, to the high-purity water, containing few such ions. Steep concentration gradients tend to strongly drive diffusion of ions from a reference electrolyte (e.g., chloride ions from a KCl electrolyte) through a conventional reference junction, which may contaminate the measure medium and cause the reference potential of the reference half-cell to drift as the concentration of electrolyte ions decreases.

The reference junction 9 may be advantageous in applications where the measured medium 8 is viscous. In such applications, the nonporous, impermeable properties of the reference junction 9 will prevent clogging of the reference junction 9, which can cause a shift of the reference potential in a conventional reference half-cell. The choice of material for the reference junction 9 may include the composition of the measured medium 8. The material of the reference junction 9 may include ions that are not present in the significant concentrations or are relatively stable with time in the measured medium 8. For example, embodiments where the reference junction 9 is lanthanum trifluoride may be employed where a measured medium has small or at least stable concentrations of fluoride.

Figure 2:
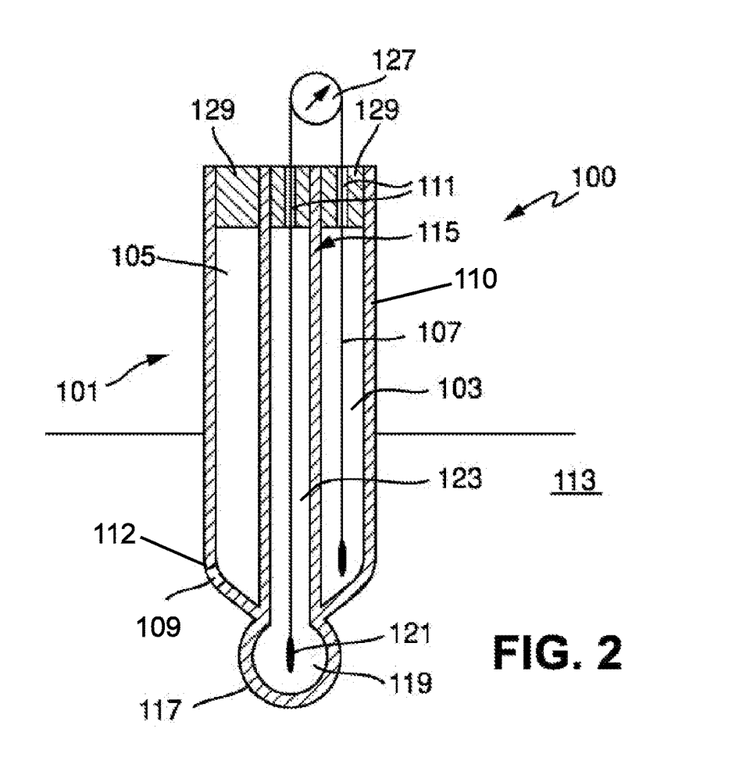
FIG. 2 shows a cross-sectional view of an embodiment of a potentiometric sensor according to the present disclosure.

The reference half-cell 10, including the reference junction 9, may be implemented in various embodiments depending on the specific application and the target analyte to be measured in a measure medium. FIG. 2 shows a potentiometric or amperometric sensor 100 exemplary of an electrochemical sensor employing a reference junction 109 according to the present disclosure, the sensor 100 partially immersed in a measured medium 113. Electrochemical sensors include pH, oxidation-reduction potential, dissolved oxygen, fluoride and chlorine sensors, among others, for example.

The sensor 100 includes a reference half-cell 101 and a measuring half-cell 115. As in the embodiment shown in FIG. 1, the reference half-cell 101 and the measuring half-cell 115 may be combined in a common housing 110 having separate chambers for the measuring half-cell 115 and the reference half-cell 101. In alternative embodiments, the reference half-cell 101 and the measuring half-cell 115 may be disposed in separate housings, or the reference half-cell 101 may be disposed in a housing and the measuring half-cell 115 may be disposed adjacent thereto as described further herein.

The common housing 110 may include an inner chamber 123, which at least partially defines the measuring half-cell 115. The measuring half-cell 115 may include a sensing element 117, on which forms a potential dependent on a concentration of a target ion in the measured medium 113 when in contact with the measured medium 113. In certain embodiments, the sensing element 117 may cap a distal end of the inner chamber 123, as shown in FIG. 2. The sensing element 117 may be an ion-sensitive membrane. In at least one embodiment, the sensing element 117 is a pH-sensitive membrane that forms a potential dependent on the pH value of the measured medium 113, for example, a pH-sensitive glass membrane. In alternative embodiments, the sensing element 117 is a crystal of lanthanum trifluoride ($LaF_3$), which may be doped with europium fluoride ($EuF_2$), to provide a fluoride-sensitive membrane. In still further embodiments the sensing element 117 may be chloride ion or oxygen ion sensitive materials.

Contained in the inner chamber 123 is an inner electrolyte 119 into which a measuring electrode 121 is at least partially immersed. In an embodiment in which the sensing element 117 is a pH-sensitive glass membrane, the inner electrolyte 119 may be a pH buffer solution. In certain embodiments, the measuring electrode 121 may be a chlorided silver wire.

The common housing 110 may include an outer chamber 103, which at least partially defines the reference half-cell 101. In at least one embodiment, as shown in FIG. 2, the common housing 110 may include the outer chamber 103 surrounding the inner chamber 123, such that the reference half-cell 101 substantially surrounds the measuring half-cell 115. Alternative configurations of the inner chamber 123 and outer chamber 103 are descried further herein. The reference half-cell 101 may include a reference electrolyte 105 contained within the outer chamber 103. The reference half-cell 101 may further include a reference electrode 107 that extends into the reference electrolyte 105. In an exemplary embodiment, the reference electrolyte 105 may be a 3 molar KCl solution. In such an embodiment or in a further embodiment, the reference electrode 107 may be a chlorided silver wire.

The reference half-cell 101 includes the reference junction 109, which may be arranged in a wall of the outer chamber 103, thereby enabling electrical communication between the reference electrolyte 105 and the measured medium 113 in operation. In at least one embodiment, the reference junction 109 may be disposed in an aperture 112 through a wall of the outer chamber 103, as shown in FIG. 2. The reference junction 109 may be disposed in the aperture 112 such that an interface between the outer chamber 103 and the reference junction 109 is impermeable to both the reference electrolyte 103 and the measured medium 113. The reference junction 109 may be embodied with the same or similar structural and functional features and properties as the reference junction 9, at least including being an electrically or ionically conductivity, nonporous, impermeable material.

As shown in FIG. 2, the sensor 100 may include a plug 129 sealing a proximal end of the common housing 110, including the inner chamber 123 and outer chamber 103. In such an embodiment, the measuring electrode 121 of the measuring half cell 115 and the reference electrode 107 of the reference half-cell 101 may extend through the plug 129. In certain embodiments, cable guides 111 electrically connected to each of the electrodes 107, 121 may extend through the plug 129. The sensor 100 may further include a measuring circuit 127 in electrically communication with the measuring electrode 121 of the measuring half cell 115 and the reference electrode 107 of the reference half-cell 101. In certain embodiments, the measuring circuit 127 may be electrically connected to the reference electrode 107 and measuring electrode 121 via the cable guides 111. The measuring circuit 127 is configured to determine a potential difference or current flow between the reference electrode 107 and the measuring electrode 121, representing the concentration of the target ion (i.e., the analyte) in the measured medium 113. In embodiments where the sensing element 117 is a pH-sensitive membrane, the potential difference determined by the measuring circuit 127 is representative of a pH value of the measured medium 113.

In certain embodiments, the measuring circuit 127 transforms and/or amplifies the potential difference as a measurement signal of the sensor 100. In such embodiments, the measuring half-cell 115 is a first galvanic half-element, which is in contact with the measured medium 113 via the sensing element 117, while the reference half-cell 101 is a second galvanic half-element. The potential difference measurable between the electrodes 107, 121 corresponds thus to a galvanic cell voltage of the sensor 100, dependent on the concentration of the target ion in the measured medium 113. In at least one embodiment, the galvanic cell voltage depends on the pH value of the measured medium 113. The measuring circuit 127 may be configured to be connected via a cable connection or wirelessly for communication with a superordinated unit, for example, a measurement transmitter, a computer or a process control station. In such embodiments, the measuring circuit 127 may be correspondingly configured to output the measurement signal to the superordinated unit, which may process the measurement signal, output the measurement signal via a user interface, store the measurement signal and/or forward the measurement signal to another superordinated unit, for example, a process control station.

Figure 3:
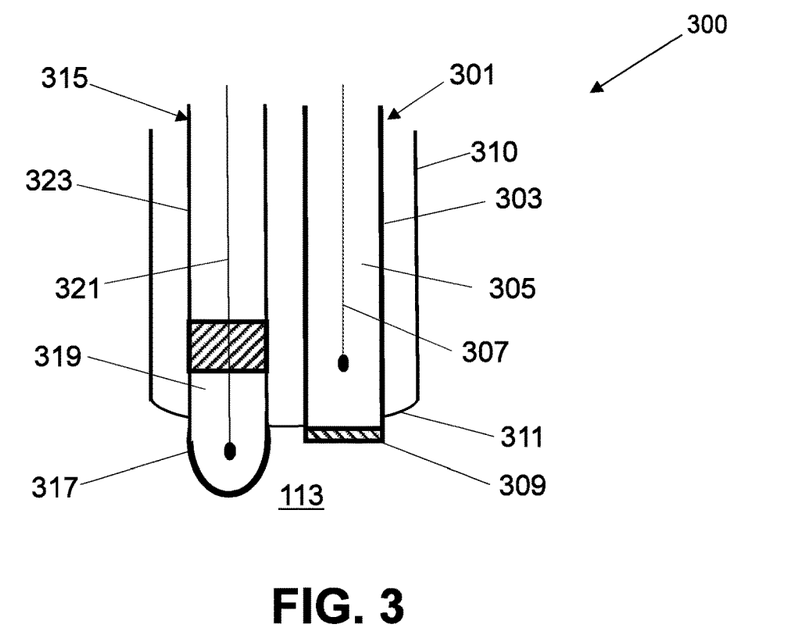
FIG. 3 shows a cross-sectional view of an embodiment of a potentiometric sensor according to the present disclosure.

FIG. 3 shows an alternative embodiment of a potentiometric or amperometric sensor 300 according to an embodiment of the present disclosure, the sensor 300 partially immersed in the measured medium 113. As shown in FIG. 3, the sensor 300 may include a measuring half-cell 315 and a reference half-cell 301 disposed adjacent one another at least partially enclosed in a common housing 310. The common housing 310 may include an end wall 311 through which the measuring half-cell 315 and the reference half-cell 301 may extend into the measured medium 113 in operation. In certain embodiments, the measuring half-cell 315 and the reference half-cell 301 may be disposed adjacent one another as to enable the flow of electric current but without a common housing.

The measuring half-cell 315 may include a first housing 323, which may be capped at a distal end by a sensing element 317 on which forms a potential dependent on a concentration of a target ion in the measured medium 113 when in contact with the measured medium 113. In at least one embodiment, the sensing element 317 has the same or similar functional features and properties as the sensing element 117 described herein. Contained in the first housing 323 is an inner electrolyte 319 into which a measuring electrode 321 is at least partially immersed. In an embodiment in which the sensing element 317 is a pH-sensitive glass membrane, the inner electrolyte 319 may be a pH buffer solution. In certain embodiments, the measuring electrode 321 may be a chlorided silver wire.

The reference half-cell 301 may include a second housing 303 and a reference electrolyte 305 contained within the second housing 303 into which a reference electrode 307 is at least partially immersed. The reference half-cell 301 may further include a reference junction 309 in contact with the reference electrolyte 305. In certain embodiments, the reference junction 309 may cap a distal end of the second housing 303, as shown in FIG. 3. In alternative embodiments, reference junction 309 may be disposed in an aperture in an end wall or other wall (not shown) of the second housing 303 such that the reference junction 309 is in contact with the reference electrolyte 305. The reference junction 309 may be fixed to the second housing 303 such that an interface between the reference junction 309 and the second housing 303 is impermeable to the reference electrolyte 305 and the measure medium 113.

The reference junction 309 enables electrical communication between the reference electrode 307 and the measuring electrode 321 via the reference electrolyte 305 and the measured medium 113 in operation. The reference junction 309 may be embodied with the same or similar structural and functional features and properties as the reference junction 9, including being an electrically or ionically conductivity, nonporous, impermeable material.

Figure 4:
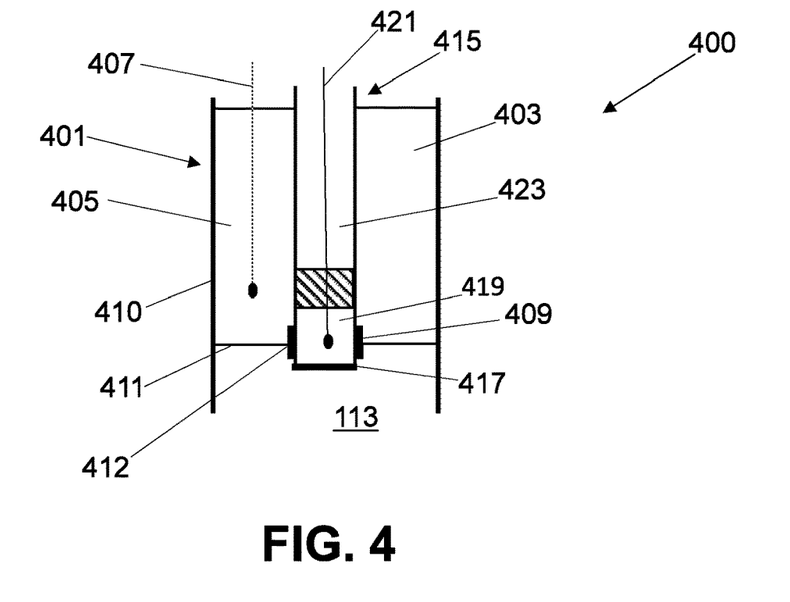
FIG. 4 shows a cross-sectional view of an embodiment of a potentiometric sensor according to the present disclosure.

FIG. 4 shows an alternative embodiment of a potentiometric or amperometric sensor 400 according to an embodiment of the present disclosure, the sensor 400 partially immersed in the measured medium 113. As shown in FIG. 4, the sensor 400 may include a measuring half-cell 415 and a reference half-cell 401 disposed adjacent one another and at least partially enclosed in a common housing 410. The common housing 410 may include multiple partition walls defining a measuring chamber 423 and a reference chamber 403, which are separated from the environment on an end by an end wall 411. In at least one embodiment, at least the measuring chamber 423 may extend through the end wall 411 and into the measured medium 113 in operation. In alternative embodiments, the measuring chamber 423 and the reference chamber 403 may be disposed in separate housings.

The measuring half-cell 415 includes the measuring chamber 423, which may contain a measuring electrolyte 419 into which a measuring electrode 421 is at least partially immersed. The measuring half-cell 415 may further include a sensing element 417 on which forms a potential dependent on a concentration of a target ion in the measured medium 113 when in contact with the measured medium 113. The sensing element 417 may cap a distal end of the measuring chamber 423 extending from the common housing 410 through the end wall 411. In at least one embodiment, the sensing element 417 has the same or similar functional features and properties as the sensing element 117 described herein.

The reference half-cell 401 includes the reference chamber 403, which may be disposed adjacent the measuring chamber 423 of the measuring half-cell 415. In certain embodiments, the reference chamber 403 may surround the measuring chamber 423, as shown in FIG. 4, and may contain a reference electrolyte 405 into which a reference electrode 407 is at least partially immersed. In an exemplary embodiment, the reference electrolyte 405 may be a 3 molar KCl solution. In a further embodiment, the reference electrode 407 may be a chlorided silver wire.

The reference half-cell 401 includes a reference junction 409 in contact with the reference electrolyte 405 and the measured medium 113. In certain embodiments, the reference junction 409 may cap a distal end of the reference chamber 403. Alternatively, as shown in FIG. 4, the reference junction 409 may extend through an aperture 412 in the end wall 411 such that an interface between the reference junction 409 and the end wall 411 is impermeable to the measuring electrolyte 419 and the measure medium 113. In at least one embodiment, the measuring chamber 423 of the measuring half-cell 415 may be cylindrical, and the reference junction 409 may be a ring or collar about the distal end of the measuring chamber 423 adjacent the sensing element 417, as shown in FIG. 4. Such an embodiment may require lower manufacturing costs and yield greater product reliability for the sensor 400.

The reference junction 409 enables electrical communication between the reference electrode 407 and the measuring electrode 421 via the reference electrolyte 405, the measuring electrolyte 419 and the measured medium 113 in operation. The reference junction 409 may be embodied with the same or similar structural and functional features and properties as the reference junction 9, including being an electrically or ionically conductivity, nonporous, impermeable material.

Figure 5:
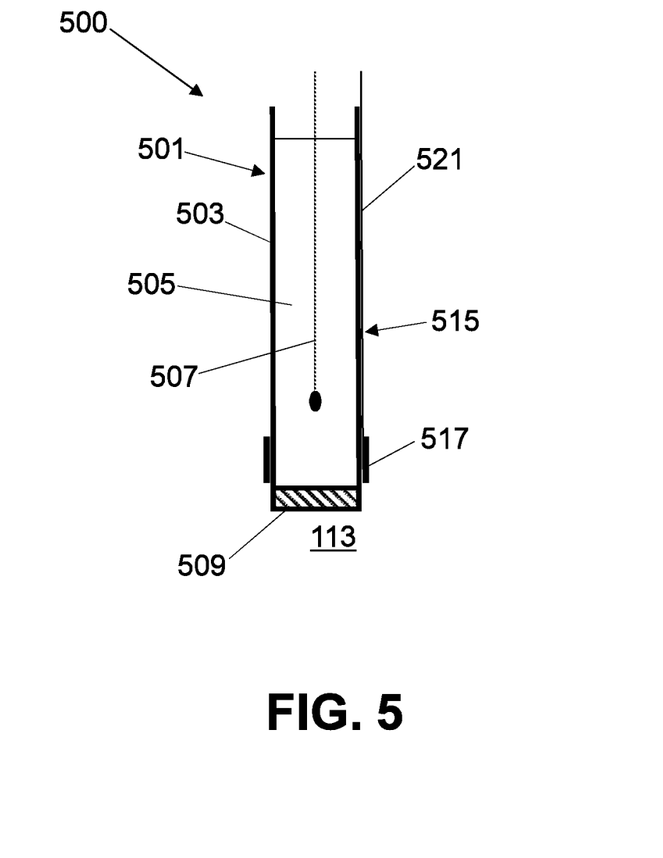
FIG. 5 shows a cross-sectional view of an embodiment of an oxidation-reduction potential sensor according to the present disclosure.

FIG. 5 shows an embodiment of an oxidation-reduction potential sensor 500 according to an embodiment of the present disclosure partially immersed in the measured medium 113. As nonlimiting examples, the sensor 500 may be employed to control oxidant (e.g., chlorine) content in drinking water and swimming pools or to control a wastewater treatment process that uses biological treatment solutions for removing contaminants, where the sensor 500 may provide a measure of oxidizing and reducing agents in the measured medium 113. As shown in FIG. 5, the sensor 500 may include a measuring half-cell 515 and a reference half-cell 501 disposed adjacent one another. In certain embodiments, the measuring half-cell 515 and the reference half-cell 501 may be at least partially enclosed in a common housing (not shown).

The measuring half-cell 515 may include a conductor 521 electrically connected to a measuring electrode 517 on which forms a potential dependent on a concentration of a target ion in the measured medium 113 when in contact with the measured medium 113. The conductor 521 and a conjunction between the conductor 521 and measuring electrode 517 may be covered by electrical insulation. In certain embodiments, the potential on the measuring electrode 517 may be dependent on the concentration of oxidizing and reducing agents in the measured medium 113. In at least one embodiment, the measuring electrode 517 may be a noble metal or an alloy thereof. As non-limiting examples, the measuring electrode 517 may be gold or platinum. In at least one embodiment, the measuring electrode 517 is a sensing element of the sensor 500.

The reference half-cell 501 may include a reference housing 503 and a reference electrolyte 505 contained within the reference housing 503, into which a reference electrode 507 is at least partially immersed. In an exemplary embodiment, the reference electrolyte 505 may be a 3 molar KCl solution. In a further embodiment, the reference electrode 507 may be a chlorided silver wire.

The reference half-cell 501 further includes a reference junction 509 in contact with the reference electrolyte 505 and the measured medium 113. In certain embodiments, the reference junction 509 may cap a distal end of the reference housing 503. In alternative embodiments, reference junction 509 may be disposed in an aperture in an end wall or other wall (not shown) of the reference housing 503 such that the reference junction 509 is in contact with the reference electrolyte 505 and the measured medium 113. The reference junction 509 may be fixed to the reference housing 503 such that an interface between the reference junction 509 and the reference housing 503 is impermeable to the reference electrolyte 505 and the measure medium 113.

The reference junction 509 enables electrical communication between the reference electrode 507 and the measuring electrode 517 via the reference electrolyte 505 and the measured medium 113 in operation. The reference junction 509 may be embodied with the same or similar structural and functional features and properties as the reference junction 9, including being an electrically or ionically conductivity, nonporous, impermeable material.

The reference electrolytes 5, 105, 305 405, 505, the measuring electrolytes 119, 319, 419, the reference electrodes 7, 107, 307, 407, 507, the measuring electrodes 121, 321, 421, and the sensing elements 117, 317, 417 may include structural and functional features and properties as known to those of ordinary skill in the art, and which may be selected for a specific application of the embodiments of the present disclosure by those of ordinary skill having the benefit of the present disclosure.

While various embodiments of a reference junction and reference half-cell and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and remain within the scope of the present disclosure.

The invention claimed is:

1. A reference half-cell for an electrochemical sensor for measuring an analyte of a measured medium, the reference half-cell comprising:
   a housing defining a chamber containing an electrolyte, the housing including a wall having an aperture therethrough;
   an electrode disposed in the electrolyte in the chamber; and
   a junction disposed in the aperture such that an interface between the junction and the housing wall is impermeable, wherein the junction is electrically conductive, is nonporous and impermeable to mass transfer between the measured medium and the electrolyte, and is insensitive to the analyte to be measured, wherein the analyte of the measuring medium is hydrogen ions ($H^+$), and
   wherein, when in contact with the measuring medium, the junction enables electrical current flow between the electrode and a measuring half-cell, which is sensitive to the analyte, and
   wherein the junction is a carbon-containing compound.

2. The reference half-cell of claim 1, wherein the junction consists essentially of graphite.

3. The reference half-cell of claim 1, wherein the junction consists essentially of glass-like carbon.

4. The reference half-cell of claim 1, wherein the junction consists essentially of graphene.

5. The reference half-cell of claim 1, wherein the electrode is a silver wire coated with a silver halide.

6. The reference half-cell of claim 5, wherein the silver halide is silver chloride, and wherein the electrolyte includes potassium chloride.

7. The reference half-cell of claim 1, wherein the electrolyte is a gel, liquid or solid.

8. An electrochemical sensor for measuring at least one measurand of a medium, comprising:
   a measuring half-cell including a measuring housing including a measuring electrode, a measuring electrolyte and an ion-selective sensing element, the ion-selective sensing element being sensitive to a species of the medium to be measured; and
   a reference half-cell including:
      a reference housing defining a chamber containing a reference electrolyte, the reference housing including a wall having an aperture therethrough;
      a reference electrode disposed in the reference electrolyte in the chamber; and
      a reference junction disposed in the aperture such that an interface between the reference junction and the housing wall is impermeable, wherein the reference junction is electrically conductive, nonporous and impermeable to mass transfer between the medium and the reference electrolyte, and insensitive to the species to be measured, wherein the species to be measured is hydrogen ions ($H^+$), and
   wherein the reference junction enables electrical current flow between the reference electrode and measuring electrode when in contact with the measuring medium.

9. The electrochemical sensor of claim 8, wherein the reference junction consists essentially of lanthanum trifluoride.

10. The electrochemical sensor of claim 8, wherein the reference junction consists essentially of a carbon-containing compound.

11. The electrochemical sensor of claim 10, wherein the reference junction consists essentially of graphite.

12. The electrochemical sensor of claim 10, wherein the reference junction consists essentially of glass-like carbon.

13. The electrochemical sensor of claim 10, wherein the reference junction consists essentially of graphene.

14. The electrochemical sensor of claim 8, wherein a total impedance of the electrochemical sensor, including a reference electrode impedance and a measuring electrode impedance, is less than 3 gigaohms.

15. An oxidation-reduction potential sensor for measuring an analyte of a medium, comprising:
   a reference half-cell including:
      a housing defining a chamber containing a reference electrolyte, the housing including a wall having an aperture therethrough;
      an electrode disposed in the reference electrolyte in the chamber; and
      a junction disposed in the aperture such that an interface between the junction and the housing wall is impermeable, wherein the junction is electrically conductive, nonporous and impermeable to mass transfer between the medium and the reference electrolyte, and insensitive to the analyte to be measured, wherein the analyte to be measured is hydrogen ions ($H^+$); and
   a measuring electrode that is sensitive to the analyte, wherein the junction enables electrical current flow between the reference electrode and measuring electrode when in contact with the medium.

16. The sensor of claim 15, wherein the junction consists essentially of lanthanum trifluoride.

17. The sensor of claim 15, wherein the junction consists essentially of graphite.

18. The sensor of claim 15, wherein the junction consists essentially of graphene.

* * * * *